(12) United States Patent
Yeh et al.

(10) Patent No.: US 7,255,842 B1
(45) Date of Patent: Aug. 14, 2007

(54) MULTI-COMPONENT REMOVAL IN FLUE GAS BY AQUA AMMONIA

(75) Inventors: James T. Yeh, Bethel Park, PA (US); Henry W. Pennline, Bethel Park, PA (US)

(73) Assignee: United States of America Department of Energy, Washington, DC (US)

( * ) Notice: Subject to any disclaimer, the term of this patent is extended or adjusted under 35 U.S.C. 154(b) by 304 days.

(21) Appl. No.: 10/664,950

(22) Filed: Sep. 22, 2003

(51) Int. Cl.
*B01D 53/50* (2006.01)
*B01D 53/56* (2006.01)
*B01D 53/62* (2006.01)
*B01D 53/68* (2006.01)

(52) U.S. Cl. ............ 423/234; 423/220; 423/235; 423/239.1; 423/240 R; 423/243.01; 423/243.03

(58) Field of Classification Search ........ 423/235, 423/239.1, 240 R, 243.01, 243.03, 243.06, 423/245.1, 245.2, 245.3, 220, 234, 243.02
See application file for complete search history.

(56) References Cited

U.S. PATENT DOCUMENTS

| | | | |
|---|---|---|---|
| 4,213,945 A * | 7/1980 | Haese et al. ........... 423/240 R |
| 4,251,496 A | 2/1981 | Longo et al. |
| 4,426,364 A | 1/1984 | Cooper et al. |
| 4,564,510 A * | 1/1986 | Bechthold et al. ......... 423/235 |
| 5,176,088 A | 1/1993 | Amrhein et al. |
| 5,273,727 A * | 12/1993 | Johnson ............... 423/243.06 |
| 5,288,303 A * | 2/1994 | Woracek et al. ............. 95/2 |
| 5,510,094 A | 4/1996 | Bhat et al. |
| 5,512,097 A | 4/1996 | Emmer et al. |
| 5,624,649 A * | 4/1997 | Gal ................... 423/243.11 |
| 5,648,053 A | 7/1997 | Mimura et al. |
| 6,197,268 B1 | 3/2001 | Hwang et al. |
| 6,221,324 B1 | 4/2001 | Coq et al. |
| 6,277,343 B1 * | 8/2001 | Gansley et al. ............. 423/210 |
| 6,355,084 B1 | 3/2002 | Izutsu et al. |
| 6,416,722 B1 | 7/2002 | Izutsu et al. |
| 6,759,022 B2 * | 7/2004 | Hammer et al. ............ 423/235 |
| 2002/0058164 A1 * | 5/2002 | Slavid et al. ............... 428/702 |
| 2004/0022707 A1 * | 2/2004 | Takacs et al. .............. 423/235 |

* cited by examiner

*Primary Examiner*—Ngoc-Yen Nguyen
(74) *Attorney, Agent, or Firm*—Mark LaMarre; Mark Dvorscak; Paul A. Gottlieb

(57) ABSTRACT

A new method for the removal of environmental compounds from gaseous streams, in particular, flue gas streams. The new method involves first oxidizing some or all of the acid anhydrides contained in the gas stream such as sulfur dioxide ($SO_2$) and nitric oxide (NO) and nitrous oxide ($N_2O$) to sulfur trioxide ($SO_3$) and nitrogen dioxide ($NO_2$). The gas stream is subsequently treated with aqua ammonia or ammonium hydroxide which captures the compounds via chemical absorption through acid-base or neutralization reactions. The products of the reactions can be collected as slurries, dewatered, and dried for use as fertilizers, or once the slurries have been dewatered, used directly as fertilizers. The ammonium hydroxide can be regenerated and recycled for use via thermal decomposition of ammonium bicarbonate, one of the products formed. There are alternative embodiments which entail stoichiometric scrubbing of nitrogen oxides and sulfur oxides with subsequent separate scrubbing of carbon dioxide.

9 Claims, 3 Drawing Sheets

MULTI-COMPONENT REMOVAL IN FLUE GAS BY AQUA AMMONIA

CONTRACTUAL ORIGIN OF INVENTION

The United States Government has rights in this invention pursuant to an employee-employer relationship between the U.S. Government and the inventors.

BACKGROUND OF THE INVENTION

1. Field of the Invention

This invention relates to a process for the treatment of industrial effluent gases, and, more specifically, this invention relates to a process for the removal of carbon dioxide ($CO_2$), nitrogen oxides ($NO_x$), and sulfur dioxide ($SO_2$), as generated from sources such as power plants that utilize fossil fuel.

2. Background of the Invention

Uncontrolled acid anhydride gases in flue gas produced by the combustion of fossil fuels have long been a cause of acid-rain-related air pollution problems. The acid anhydride precursor gases which cause the most serious problems are sulfur dioxide ($SO_2$) and nitrogen oxides ($NO_x$). (Sulfur dioxide and NO are precursors to sulfur trioxide ($SO_3$) and nitrogen dioxide ($NO_2$)). Another acid anhydride precursor gas caused by fossil fuel combustion is carbon dioxide ($CO_2$) which can cause global climate change or the "greenhouse effect." Carbon dioxide can exist in flue gases at concentrations hundred of times higher than the combined concentrations of $SO_2$ and $NO_x$.

Methods to prevent these acid anhydride gases from entering the atmosphere are technically complex and very costly, especially if each acid gas is to be removed by a different technology. For example, limestone slurry (calcium carbonate, $CaCO_3$) scrubbing can be used for $SO_2$ removal with subsequent selective catalytic reduction (SCR) for $NO_x$ reduction and a wet scrubbing amine process (e.g., monoethanolamine, MEA) for $CO_2$ capture.

Amine-Based $CO_2$ Absorption Technologies

Absorption processes using aqueous amine solutions have been used to remove $CO_2$ from gas streams in some industries. These processes often are referred to as wet chemical scrubbing.

Wet chemical scrubbing of $CO_2$ involves one or more reversible chemical reactions between $CO_2$ and amine substances in aqueous solutions of monoethanolamine (MEA) or diethanolamine (DEA) to produce a liquid species, such as a carbamate. Upon heating, the carbamate breaks down to free $CO_2$, with the original amine regenerated to react with additional $CO_2$. An example of the process, with MEA, is given by Equation 1:

Equation 1 for which the two moieties represented by R may be either any alkyl moiety, any aryl moiety, or any combination thereof. At high $CO_2$ concentrations, bicarbonate formation may also take place.

Typically, these amines, MEA and DEA, are used as 15 to 30 wt. % amine in aqueous solution. The amine solution enters the top of an absorption tower while the carbon dioxide containing gaseous stream is introduced at the bottom. During contact with the $CO_2$-containing gaseous stream, the amine solution chemically absorbs the $CO_2$ from the gaseous stream to create a carbamate. Conversion of carbamate ions back to $CO_2$ proceeds through a thermal regeneration process, typically at a temperature of about 120° C. Carbon dioxide and water emerge from the amine solution and the water is separated via condensation using a heat exchanger. After regeneration, the amine solution is recycled back to the absorption tower for additional $CO_2$ absorption.

Carbon dioxide capture and regeneration in the above-described manner require high temperatures or very low vacuum. Regeneration of $CO_2$ from MEA solution may use up to 80% of the total energy consumed in the $CO_2$ absorption and regeneration cycle. As such, the process outlined supra is energy intensive. Further, the amine solution has a limited lifetime due to degradation through oxidation of the amine. In addition, high amine concentrations and high $CO_2$ loadings exacerbate corrosion problems of process equipment.

MEA systems require that $SO_2$ be removed first from flue gas streams, otherwise, MEA is degraded by $SO_2$ and oxygen ($O_2$), forming irreversible products. Specifically, if the $SO_2$ is not removed, amines combine with $SO_2$ in flue gases from coal-burning power plants to produce insoluble salts. The insoluble salts cannot be regenerated by thermal decomposition. Thus, the insoluble salt must be disposed of at a considerable cost. Also, the amine solvents such as MEA must be replenished because part of it forms the waste-byproduct along with $SO_2$.

$NO_x$ must also be eventually removed from the flue gas before it is discharged into the air in order to meet present and future gaseous emission limits. $NO_x$ nominally consists of approximately 95% NO (nitric oxide) and 5% $NO_2$ (nitrogen dioxide). $NO_x$ removal occurs upstream of the $CO_2$ absorber and is accomplished by low $NO_x$ burners and/or selective catalytic reduction.

Current Ammonia-Based $SO_2$ Absorption Technologies

Commercial processes exist that contact environmental flue gases with gaseous ammonia to remove sulfur oxides. Ammonium bisulfite is formed with subsequent oxidation to ammonium bisulfate, and eventual neutralization of the bisulfate with water and ammonia to form ammonium sulfate.

Other processes contact combustion or flue gases containing sulfur oxides with solutions of ammonium sulfate/sulfite, and in one instance, the resulting solution is reacted with $H_2S$ to form ammonium thiosulfate. These aqueous-based processes do not remove nitrogen oxides, primarily because the more abundant nitric oxide has a limited solubility in water.

One commercial process uses ammonia to simultaneously remove $SO_2$ and $NO_x$ within one reactor and produce mixed ammonium sulfate and nitrate fertilizer. This process is described in R. R. Lunt and J. D. Curic, *Profiles in Flue Gas Desulfurization*, 76-77, American Institute of Chemical Engineers (2000). Flue gas is first partially saturated and cooled with water to a temperature of 150°±10° F. The flue gas is subsequently mixed with ammonia and passed to the reactor where the flue gas-ammonia mixture is subjected to beams of high energy electrons to oxidize the sulfur dioxide and $NO_x$. These oxidized species subsequently react with the ammonia to form ammonium sulfate and ammonium nitrate particulate. This process does not address the greenhouse gas ($CO_2$) capture and removal problem. Further, the process gives an undesirable trace byproduct, ammonium sulfamate, which is harmful to crops. Finally, the process is expensive.

Studies demonstrate the efficacy of a wet ammonia scrubbing process for the removal of carbon dioxide from flue gases. A. C. Yeh and H. Bai, "Comparison of Ammonia and Monoethanolamine Solvents to reduce $CO_2$ Greenhouse Gas Emissions," *The Science of the Total Environment*, 228, 121-133 (1999), and H. Bai and A. C. Yeh, "Removal of $CO_2$ Greenhouse Gas by Ammonia Scrubbing," *Ind. Eng. Chem. Res.*, 36(6), 2490-2493 (1997). The $CO_2$ regeneration step in this process requires no more than 20% of the energy necessary for the $CO_2$ regeneration step in MEA-based processes. Further, the regeneration temperature (60° C.) in this wet scrubbing process is half that required in MEA systems.

The Krupp Koppers process uses ammonia ($NH_3$) solution in a wet scrubber to remove $SO_2$ from flue gas. However, inasmuch as NO is not soluble in ammonia solution (NO must be oxidized to $NO_2$ to become soluble in ammonia solution), NO is removed by a second process in a second reactor, which is called Selective Catalytic Reduction (SCR). The SCR process is energy-intensive because the flue gas must be reheated to 300° C. This process is described in W. Schulte, "Flue Gas Cleaning With Ammonia Reduces $SO_2$ and $NO_x$ Emissions," *Thirteenth International Pittsburgh Coal Conference Proceedings*, Sep. 3-7, 1996, Pittsburgh, Pa.

The Marsulex process is similar to the Krupp Koppers process in that Marsulex focuses on $SO_2$ removal using ammonia in a wet scrubber. However, the Marsulex process does not address $CO_2$ and $NO_x$ capture and removal from flue gases. This process is described in M. A. Walsh, Jr., "New Marsulex Technology Significantly Cuts Power Generation Costs," Corporate Publication (2000).

Gas-phase oxidation of nitric oxide (NO) to water-soluble nitrogen dioxide ($NO_2$) can be accomplished by strong oxidizing agents such as hydrogen peroxide ($H_2O_2$), ozone ($O_3$), and chlorine dioxide ($ClO_2$). Hydrogen peroxide-enhanced gas phase oxidation of nitric oxide has been demonstrated. J. M. Kasper, C. A. Clausen III, and D. C. Cooper, "Control of Nitrogen Oxide Emissions by Hydrogen Peroxide-Enhanced Gas-Phase Oxidation of Nitric Oxide," *Air & Waste Manage. Assoc.*, 46(2) 127-133 (1996).

U.S. Pat. Nos. 6,416,722 and 6,355,084 awarded to Izutsu, et al. on Jul. 9, 2002 and Mar. 12, 2002, respectively, disclose a method for desulfurizing gases by contacting sulfur oxides with gaseous ammonia with subsequent electron beam irradiation.

U.S. Pat. No. 6,221,324 awarded to Coq, et al. on Apr. 24, 2001 discloses a method for the removal of nitrogen oxides from waste streams by selective catalytic reduction contacting the waste gaseous stream with ammonia over zeolite catalysts.

U.S. Pat. No. 6,197,268 awarded to Hwang, et al. on Mar. 6, 2001 discloses a method for the removal of nitrogen oxides from waste streams by contacting the waste gaseous stream with gaseous ammonia.

U.S. Pat. No. 5,648,053 awarded to Mimura, et al. on Jul. 15, 1997 discloses a method for the removal of both carbon dioxide and nitrogen oxides from combustion or flue gases by contacting the gaseous stream, after oxidation treatment, with an alcohol amine.

U.S. Pat. No. 5,512,097 awarded to Emmer on Apr. 30, 1996 discloses a method for the removal of sulfur oxides from waste streams by contacting the waste gaseous stream with an aqueous slurry of finely comminuted limestone.

U.S. Pat. No. 5,510,094 awarded to Bhat, et al. on Apr. 23, 1996 discloses a method for the removal of sulfur oxides from waste streams by contacting the waste gaseous stream with oxidants. Subsequent to oxidation, the gaseous stream is contacted with an aqueous slurry of limestone and gaseous ammonia in a scrubber tower.

U.S. Pat. No. 5,176,088 awarded to Amrhein, et al. on Jan. 5, 1993 discloses a device and method for the simultaneous removal of nitrogen oxides and sulfur oxides from furnace exhausts. Injections of limestone, then ammonia are made into the furnace with subsequent contacting of the furnace waste stream with ammonia and calcium sorbent in a dry scrubber for additional sulfur oxides removal.

U.S. Pat. No. 4,426,364 awarded to Cooper on Jan. 17, 1984 discloses a method for removing nitrogen oxides from gases, after oxidation treatment, by contacting the gases with a bicarbonate/carbonate aqueous solution.

U.S. Pat. No. 4,251,496 awarded to Longo, et al. on Feb. 17, 1981 discloses a method for removing sulfur oxides and nitrogen oxides by first contacting the gaseous mixture with cerium oxide to remove sulfur oxides, then contacting the gaseous mixture with gaseous ammonia to remove nitrogen oxides.

None of the aforementioned patents or papers disclose any efficacious method or process for the simultaneous removal of a plurality of gaseous acid anhydrides and acid halides from combustion or flue gases. In addition, the state of the art does not disclose an aqua ammonia scrubbing process for gaseous acid anhydrides and gaseous acid halides. None of the aforementioned patents, papers, and processes address the potential capture and removal of greenhouse gases ($CO_2$), together with removal of $SO_2$ and NOx.

A need exists in the art for a method and device to remove all environmental gases, including $CO_2$, from flue gases without producing any harmful byproducts. The method should be an aqueous-based ammonia scrubbing method and device to facilitate the removal of gaseous acid anhydrides, including nitric oxide, and acid halides from combustion or flue gases. Finally, the method and device should have low energy usage to minimize costs.

SUMMARY OF INVENTION

An object of the present invention is to provide a method for the removal of compounds from gases that overcomes many of the disadvantages of the prior art.

Another object of the present invention is to provide a new method for the removal of compounds from flue gases. A feature of the invention is the elimination of the need for amine-based solvents. An advantage is that the new method is less costly.

Still, another object of the present invention is to provide a method for removing anhydrides from an effluent over a range of temperatures. A feature of the invention is that the solvents used in this method absorb $SO_2$, $NO_x$, and $CO_2$ from about 15° C. to 50° C. via a chemical absorption process. An advantage of the invention is that these solvents can absorb at temperatures below and above normal ambient temperatures with no degradation of the solvent.

Yet another object of the present invention is to provide a method for removing anhydrides from a fluid stream, whereby the method uses a recyclable solvent. A feature of the invention is that regeneration and reuse of the solvent can be accomplished through many cycles by heating, above 60° C., absorption products formed from the solvent during use. An advantage of the invention is that the regeneration process is less costly.

Still another object of the present invention is to provide a method for extracting $SO_2$, $NO_x$, and $CO_2$ from a waste stream, the method utilizing a thermally stable solvent. A feature of the invention is that the solvent and the absorption products generated from use of the solvent can be heated to temperatures above 60° C. to regenerate the solvent with little or no degradation of the solvent even after repeated heating cycles. An advantage of the invention is that the solvent makeup or replacement rate is greatly diminished.

Yet another object of the present invention is to provide a method for removing $SO_2$, $NO_x$, and $CO_2$ from a fluid stream wherein the method utilizes an ammonia-based solvent. A feature of the invention is that ammonia has a high loading capacity for carbon dioxide. An advantage of this feature is that ammonia is more effective and efficient in absorbing carbon dioxide and thus less ammonia is needed relative to other solvents, further reducing storage, handling volume, and costs.

Still, another object of the present invention is to provide a method which makes useful products from $SO_2$, $NO_x$, and $CO_2$. A feature of the invention is that the oxides are converted into compounds which are useful as fertilizers. An advantage of the invention is that the invention does not produce insoluble salts which cannot be thermally decomposed to regenerate ammonia.

Yet another object of the present invention is to provide an effluent scrubbing method which uses benign scrubbing agents. A feature of the invention is the use of ammonia-based solvents. An advantage of the invention is that the active extraction moiety is not corrosive. Therefore, the equipment used for handling of the scrubbing agent is simplified, and costs are lowered.

Yet another object of the present invention is to provide a method which makes fertilizers from $SO_2$, $NO_x$, and $CO_2$-laden effluents at minimal cost. A feature of the invention is that it generates water slurries containing the fertilizers and fertilizer feedstocks. An advantage of the invention is that energy is conserved because there is no need to evaporate, or otherwise remove, a large amount of water from the slurry product.

Briefly, the invention provides a process for removing acid anhydrides from flue gases, the process comprising cooling the flue gases; removal of particulate matter from the flue gases; oxidizing the anhydrides; converting the oxidized anhydrides to ammonia salts; and collecting the salts.

The invention also provides a device for the direct removal of acid anhydrides from a gas stream, the device comprising a means for cooling the gas stream; a means for eliminating particulate matter from the gas stream after cooling; a means for oxidizing the anhydrides present in the gas stream after the removal of particulate matter; a means for converting the oxidized anhydrides to salts; a means for regenerating the converting means; and a means for isolating the salts from the gas stream.

BRIEF DESCRIPTION OF DRAWINGS

The invention together with the above and other objects and advantages will be best understood from the following detailed description of the preferred embodiment of the invention shown in the accompanying drawings, wherein.

DETAILED DESCRIPTION OF THE INVENTION

Figure 1:
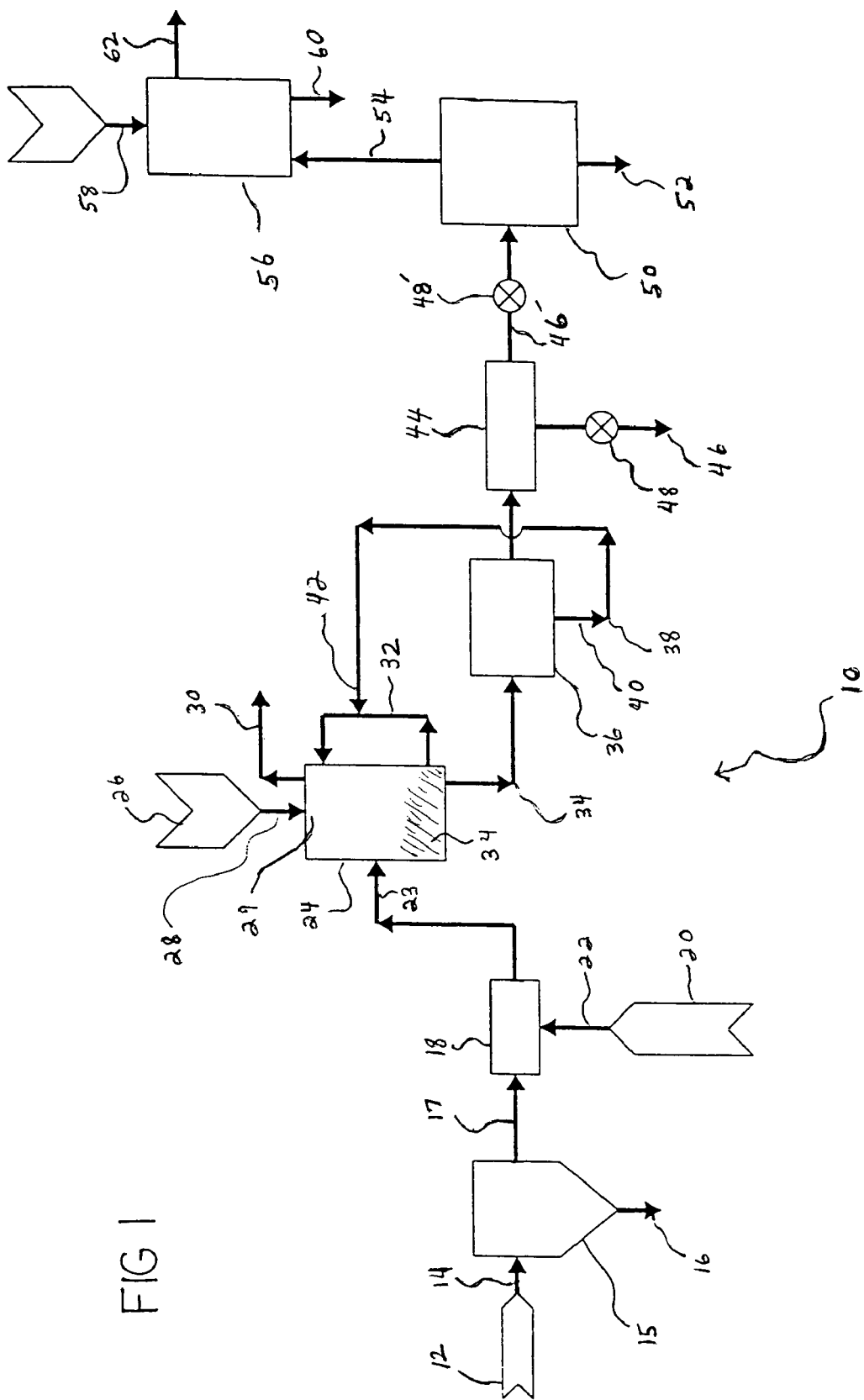
FIG. 1 is a schematic of a process flow diagram for an aqua ammonia process for the simultaneous removal of $CO_2$, $SO_2$, $NO_x$, HCl, and HF from flue gas, in accordance with features of the present invention.

The invention provides a wet, regenerable scrubbing process using ammonium hydroxide ($NH_4OH$) solution to remove acid anhydride moiety gases, and trace amounts of hydrogen chloride gas (HCl) and hydrogen fluoride (HF) gas in a gas-liquid contacting reactor. In particular, the invention uses "aqua ammonia" or an aqueous ammonia scrubbing liquor such as [$NH_3$ (aq)/ammonium hydroxide ($NH_4OH$)] to extract certain effluent compounds via acid-base or neutralization reactions.

Generally, an effluent gas is subjected to chemical scrubbing with aqueous ammonia or some other ammonia-containing compound in a gas-liquid contactor reactor or a scrubber to remove gaseous acid anhydride moieties. The chemical scrubbing produces ammonium salts of the conjugate bases of the acid anhydride moieties. Thermal regeneration of the ammonia scrubbing liquor occurs in an adjacent vessel or remotely.

The more typical gaseous acid anhydride moieties suitable for extraction and conversion include, but are not limited to, carbon dioxide ($CO_2$), sulfur dioxide ($SO_2$), sulfur trioxide ($SO_3$), and nitrogen oxides ($NO_x$). However, other extraction candidates include hydrogen chloride/hydrochloric acid (HCl) and hydrogen fluoride/hydrofluoric acid (HF). Preferably, some of the gaseous anhydride moieties initially present are oxidized to higher gaseous acid anhydride moieties to improve their reactivity with ammonium hydroxide. These particular gaseous anhydride moieties to be oxidized include, but are not limited to, sulfur oxides such as sulfur dioxide ($SO_2$), and nitrogen oxides such as nitrous oxide ($N_2O$) and nitric oxide (NO). The oxidation product moieties or higher gaseous acid anhydride moieties include, but are not limited to, sulfur trioxide ($SO_3$), and nitrogen dioxide ($NO_2$). The step of converting the acid anhydrides includes reacting the oxidized anhydrides with ammonia-containing compounds. The ammonia-containing compounds are water-soluble compounds selected from the group consisting of aqueous ammonia, ammonium hydroxide, ammonium carbonate, ammonium carbamate solutions, and combinations thereof.

The invented process generally comprises the following: flue gas is cooled, passes through a particulate collection device, then is oxidized by strong oxidant prior to entering the gas-liquid contactor reactor. In the oxidizer, lower acid anhydride moieties can be oxidized to higher acid anhydride moieties, e.g., sulfur dioxide ($SO_2$) is converted to sulfur trioxide ($SO_3$), and nitric oxide (NO) is oxidized to nitrogen dioxide ($NO_2$). The contactor reactor temperature is in the range of from about 15° C. to 50° C. for the simultaneous absorption of carbon dioxide ($CO_2$), $SO_3$, and $NO_2$. Carbon dioxide, nitrogen dioxide, sulfur trioxide, hydrogen chloride, and hydrogen fluoride react with ammonia or ammonium hydroxide solution in a scrubber to form ammonium bicarbonate ($NH_4HCO_3$) and/or ammonium carbonate (($NH_4)_2CO_3$); ammonium nitrate ($NH_4NO_3$); ammonium sulfate (($NH_4)_2SO_4$); ammonium chloride ($NH_4Cl$); and ammonium fluoride ($NH_4F$), respectively, according to Equations 1 through 5.

$$CO_2 + NH_4OH \rightarrow NH_4HCO_3 \quad \text{Equation 1(a)}$$

$$CO_2 + 2NH_3 + H_2O \rightarrow (NH_4)_2CO_3 \quad \text{Equation 1(b)}$$

$$2NO_2 + 2NH_3 + H_2O \rightarrow NH_4NO_3 + NH_4NO_2 \quad \text{Equation 2 (a)}$$

$$NH_4NO_2 + \tfrac{1}{2} O_2 NH_4NO_3 \quad \text{Equation 2 (b)}$$

$$SO_3 + 2NH_4OH \rightarrow (NH_4)_2SO_4 + H_2O \quad \text{Equation 3}$$

$$HCl + NH_4OH \rightarrow NH_4Cl + H_2O \quad \text{Equation 4}$$

$$HF + NH_4OH \rightarrow NH_4F + H_2O \quad \text{Equation 5}$$

The ammonium salt products of the neutralization/acid-base reactions can be dewatered by filtration or centrifugation for use as fertilizers, or dried and crystallized. In the alternative, the ammonium bicarbonate formed can be decomposed to regenerate the ammonia.

Accordingly, a salient feature of the instant invention is that aqua ammonia is used to remove environmental compounds from effluent gases via absorption with subsequent regeneration and recycling of the aqua ammonia, and little or no degradation of the ammonia itself. In addition, oxidation of gaseous acid anhydride moieties occurs before the gases are contacted with aqua ammonia. Further, the instant invention requires less energy than what is required by many current flue gas treatment systems.

The removal efficiency of carbon dioxide by aqua ammonia can be as high as 99%, and aqua ammonia's loading capacity for carbon dioxide is greater than unity, and can approach 1.20 kilograms (Kg) of carbon dioxide for each Kg of ammonia.

Gaseous ammonia loss into the atmosphere can be minimized by the placement of a mist eliminator in fluid communication with the gas-liquid contactor reactor or scrubber. The mist eliminator comprises a plurality of heat exchanging surfaces which, when combined with water, provides an exemplary means for eliminating aqueous ammonia from any aerosol secondary stream. Essentially, the water washes out the ammonia in the gaseous phase.

There are at least three preferred embodiments of the instant invention. These three embodiments present options as to how to handle the ammonium bicarbonate produced by the instant invention.

For the three preferred embodiments described infra, the terms "ingress" and "egress" represent, in part, valves controlling the flow and movement of gas, liquids, and solids. Most of these valves are not shown in FIGS. 1-3 which depict the three preferred embodiments.

In addition, for all three preferred embodiments, movement of the flue gas is facilitated by one or even two fans. One fan can be an induced draft fan (ID fan) which produces a slight positive pressure. An ID fan is commonly installed in either the chimney inlet in an effluent gas producing plant to force the flue gas to flow upward to exit the smoke stack, or after the particulate control device (PCD) infra to force the flue gas to flow through an acidic gas scrubber (i.e., $SO_2$) in a flue gas treatment system. A fan can also be placed downstream in each of the three embodiments to provide a slight negative pressure which draws gases out of the systems. The precise locations of the fan(s) will depend upon the operating requirements of the actual plants.

Further, pressures throughout the flue gas treatment system will also depend upon the needs of the actual treatment plants.

General Process Detail

FIG. 1 depicts an exemplary process for the multipollutant control of $SO_2$, $NO_x$, $CO_2$, and trace acids such as hydrochloric acid (HCl) and hydrofluoric acid (HF), with integrated reaction and sorption steps, the process designated as numeral 10. Generally, ambient atmospheric pressures of about 14.7 pounds per square inch absolute (psia) are accommodated in this process, but pressures ranging from approximately 10 psia to 300 psia also are suitable.

First, hot flue gas 12, containing nitrogen, oxygen, water vapor, and a number of acid anhydride gases such as $CO_2$, $SO_2$, and $NO_x$, is first cooled by an "air preheater" (not shown). The air preheater is a heat exchanger that transfers the hot flue gas's thermal energy to preheat ambient fresh air then used in the ongoing combustion. The flue gas 12 subsequently enters into the system 10. After being controlled to a predetermined temperature, the flue gas 12 enters a particulate control device (PCD) 15 such as a baghouse and/or electrostatic precipitator from which any collected particulate matter is removed at a suitable point of egress 16. Ingress into the PCD is controlled via a valve or some other means for controlling ingress 14 into the PCD.

The flue gas 12 subsequently has ingress 17 into an oxidizer reactor 18 into which oxidants 20 also have ingress 22. The oxidants 20 can be gases or vaporized liquids or radiation initiated and have ingress 22. The presence of the oxidants 20 in the reactor 18 causes $SO_2$ and/or $NO_x$ to be oxidized to $SO_3$ and/or $NO_2$, respectively. Oxidation of only NO may occur. The now-oxidized flue gas, containing $SO_3$ and $NO_2$, then enters a first scrubber 24 at a suitable point of 23. In the scrubber, the oxidized moieties contact ammonium hydroxide 26. The ammonium hydroxide enters the scrubber 24 at a separate point of ingress 28.

In the first scrubber 24, all acid anhydride gases are neutralized via acid-base/neutralization reactions using ammonium hydroxide sprays 29 or some other means of high volume dispersion of ammonium hydroxide. Preferably, the ammonium hydroxide sprays enter the system 10 via a means to prevent any pressure drop (an exemplary means being a centrifuge spray nozzle), and at a temperature from about 15° C. to 50° C. The ammonium hydroxide concentration in water can range from about 7 wt. % to 28 wt. %.

Nitrogen ($N_2$), oxygen ($O_2$), and water vapor exit from the first scrubber 24 at an egress point 30 so situated to minimize the likelihood of these gases remixing with the product liquor, i.e., slurry 34. The ammonium hydroxide is recirculated 32 for the purpose of the neutralization reactions.

The products of the neutralization reactions are ammonium salts and exist initially as the slurry 34 of crystalline salts in water. This slurry 34 of salts is dewatered by filtration centrifugation 36, or some other means which will not decompose the salts. Any resulting supernatant 38 is recycled via a point of ingress 42 to the recirculation loop 32 and the first scrubber 24. Ultimately, the supernatant 38 is mixed with the contents of the first scrubber reactor 24.

The salts formed from the neutralization reactions contact a crystallizer 44 or some other drying means. The salts have a point of egress 46, via valves 48, from the system 10 to be eventually used as fertilizer. All of the salts from the crystallizer 44 can be used as fertilizer. Alternatively, the salts can pass a point of egress 46', via valve 48', into regenerator 50 where ammonium bicarbonate (typically greater than 80 wt. % of the slurry/salt mixture) is thermally decomposed to ammonia and carbon dioxide at a predetermined temperature. Decomposition temperatures of from 35° C. to 80° C. can be used, with 60° C. being a preferred temperature. The other remaining ammonium salts (for example, ammonium chloride, ammonium fluoride, ammonium nitrate, and ammonium sulfate) have a point of egress 52 from the regenerator 50. The salts from the crystallizer 44 can be used as is for use as a fertilizer, regenerated or a combination of both end uses.

The gas mixture of carbon dioxide, ammonia, and water vapor generated by the thermal decomposition of ammonium bicarbonate has ingress 54 into a second scrubber 56. The second scrubber 56 provides a means for sequestering ammonia entrained in the gas mixture. The sequestering agent in the second scrubber 56 is water-based (e.g., water) with a point of ingress 58. The final form of the sequestered ammonia is ammonium hydroxide, 26. Liquid-phase ammonium hydroxide subsequently has egress 60 from the second scrubber 56 and is recycled. Due to its much lower solubility in water, carbon dioxide exits the second scrubber 56 from a suitable means of egress 62 and compressed for either storage or subsequent use.

Downstream $CO_2$-Processing Detail

The instant invention also provides that $SO_2$ and $NO_x$ are scrubbed with stoichiometric amounts of ammonia with subsequent separate scrubbing of $CO_2$ with ammonia.

Figure 2:
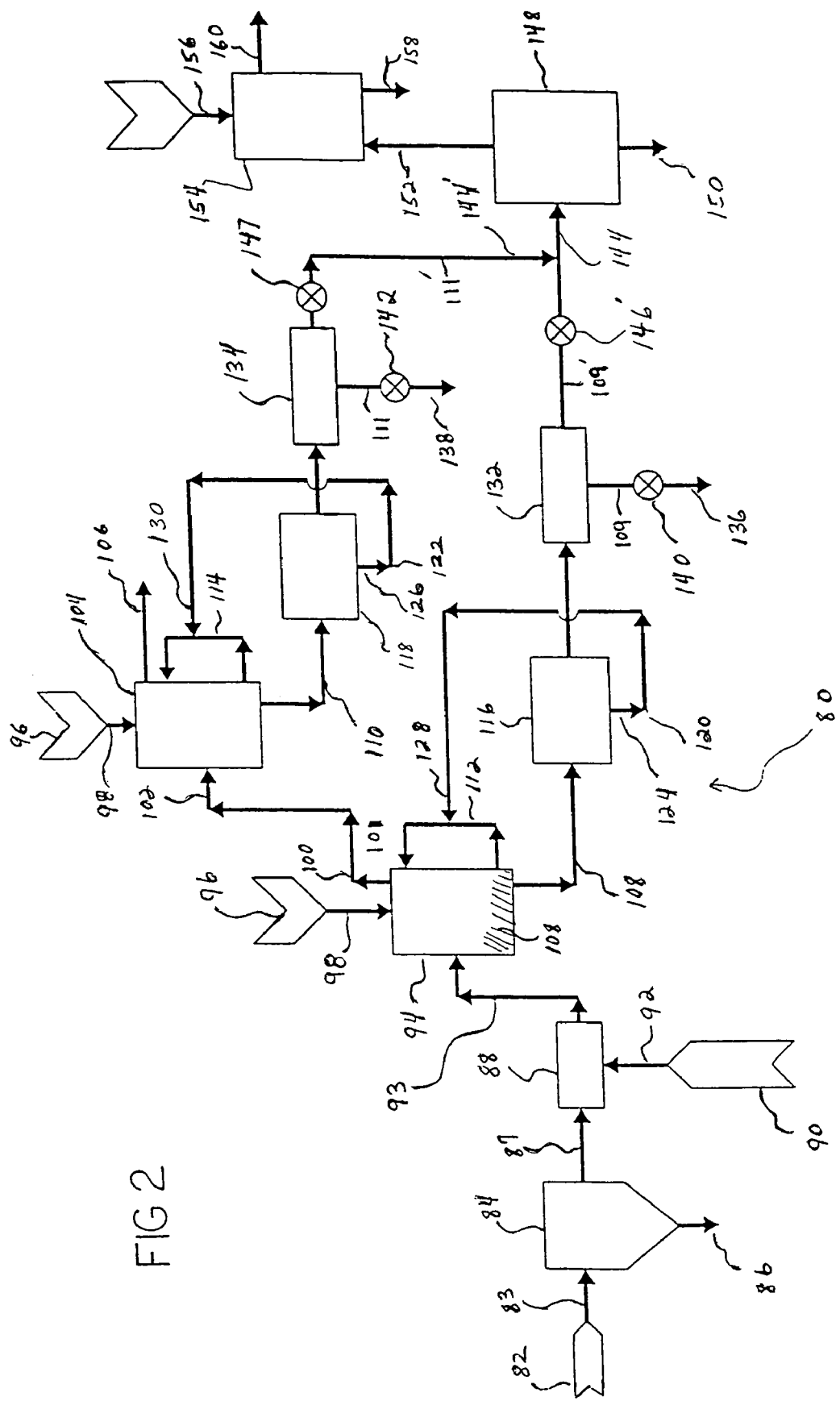
FIG. 2 is a schematic of an alternate process flow diagram for an aqua ammonia process for the simultaneous removal of $SO_2$, $NO_x$, HCl, and HF from flue gas with subsequent separate removal of $CO_2$ and regeneration of ammonia from the crystalline $CO_2$ removal product, in accordance with features of the present invention.

FIG. 2 depicts an alternate exemplary process, designated as numeral 80, for the multipollutant control of $SO_2$, $NO_x$, $CO_2$, and trace acids such as hydrochloric acid (HCl) and hydrofluoric acid (HF). The process features integrated reaction and sorption steps in which $SO_3$ and $NO_2$ are simultaneously scrubbed stoichiometrically. $CO_2$ is not initially scrubbed. As before, pressures of from about 10 psia to 300 psia can be accommodated in this process, with 14 psia to 20 psia typically encountered.

The flue gas 82, acid anhydride gases, inlet pressure of the flue gas 82, ingress 83 to the PCD 84, particulate matter egress 86, ingress details 87 of flue gas 82 to the oxidizer reactor 88, oxidants 90, and ingress details 92 of the oxidants are as aforementioned. As before, the flue gas 82 containing $SO_3$ and $NO_2$ in the oxidizer 88, subsequently has ingress 93 to, or otherwise contacts a first scrubber 94. Ammonium hydroxide 96 has remote ingress 98 into the scrubber 94 in an amount sufficient for stoichiometric reaction of the two acid anhydrides with the ammonium hydroxide 96. The carbon dioxide also present is not reacted or "scrubbed" due to the stoichiometric amount of ammonium hydroxide 96 used and the much greater acid strength of $SO_3$ and $NO_2$ relative to the acid strength of carbon dioxide. This difference in acid strengths allows for differentiation between the gases at this point in the process.

A partially treated stream 101 containing carbon dioxide ($CO_2$), nitrogen ($N_2$), oxygen ($O_2$), and water vapor have a point of egress 100 from the first scrubber 94, and a subsequent point of ingress 102 to a second scrubber 104 where the mixture is treated. Ammonium hydroxide 96 also has ingress 98 into this second scrubber 104. Nitrogen ($N_2$), oxygen ($O_2$), and water vapor have egress 106 from the second scrubber 104. As before, the products of the neutralization reactions are ammonium salts and exist as a first slurry 108 and a second slurry 110 comprising crystalline salts in water. Any ammonium hydroxide 96 not utilized in the neutralization steps is subjected to a first recirculation process 112 and a second recirculation process 114 for subsequent reuse in those respective neutralization steps.

The first slurry 108 contains ammonium chloride, ammonium fluoride, ammonium nitrate, ammonium sulfate, and slight amounts of ammonium bicarbonate. The second slurry 110 contains only ammonium bicarbonate. The first slurry 108 and the second slurry 110 are each dewatered by a first filtration or centrifugation 116 and a second filtration or centrifugation 118, respectively. The first supernatant 120 and the second supernatant 122 have a first point of egress 124 and a second point of egress 126 from the first filter or centrifuge 116 and the second filter or centrifuge 118, respectively, then are recycled via a first point of ingress 128 to the first scrubber 94 and a second point of ingress 130 to the second scrubber 104, respectively.

The first slurry 108 (ammonium chloride, ammonium fluoride, ammonium nitrate, ammonium sulfate, and possible trace amounts of ammonium bicarbonate) and the second slurry 110 (ammonium bicarbonate) then go through a first crystallizer 132 and a second crystallizer 134, respectively, to be dried (e.g., a spray dryer or hot air forced circulation can be utilized). After having been dried, the first slurry cake or crystal 109 (now a solid salt mixture) and the second slurry cake or crystal 111 (now solid ammonium bicarbonate) have first egress 136 and second egress 138, via flow control means such as a first valve 140 and a second valve 142, respectively, from the system 80 to be eventually used as fertilizer. Alternatively, the first and second crystal or powder streams, 109' and 111' respectively, having ingress 144 and 144' respectively, via valves 146' and 147' into a regenerator 148 where the solids are heated, and ammonium bicarbonate is thermally decomposed to ammonia and carbon dioxide at a temperature of from about 35° C. to 80° C., with the preferred temperature being 60° C. An option is that only the second crystal or powder stream 111' from the second scrubber 104 is sent to the regenerator 148 and the first crystal or powder stream 109 from the first scrubber 94 is used directly as fertilizer or visa-versa.

The remaining ammonium salts (ammonium chloride, ammonium fluoride, ammonium nitrate, and ammonium sulfate) exit from the regenerator 148 via a separate means of egress 150. Gravity can serve as the means for driving the flow of all crystals or powders through valves, into the regenerators, and out of the system.

Again as described supra, the gas mixture of carbon dioxide, ammonia, and water vapor generated by the thermal decomposition of ammonium bicarbonate and ammonium carbonate has ingress 152 into and contacts a third scrubber 154 which serves to sequester ammonia. Water, with a point of ingress 156, is typical for use in the third scrubber 154. The ammonium hydroxide subsequently has egress 158 from the third scrubber 154 for recycling. Carbon dioxide exits the third scrubber 154 from a different means of egress 160 to be eventually sequestered or used.

In summary, in this second embodiment carbon dioxide ($CO_2$) is not scrubbed in the first scrubber. The byproducts of the first stage scrubber are primarily ammonium chloride, ammonium fluoride, ammonium nitrate, and ammonium sulfate. Carbon dioxide is absorbed in the second stage scrubber, where ammonium bicarbonate is produced.

Figure 3:
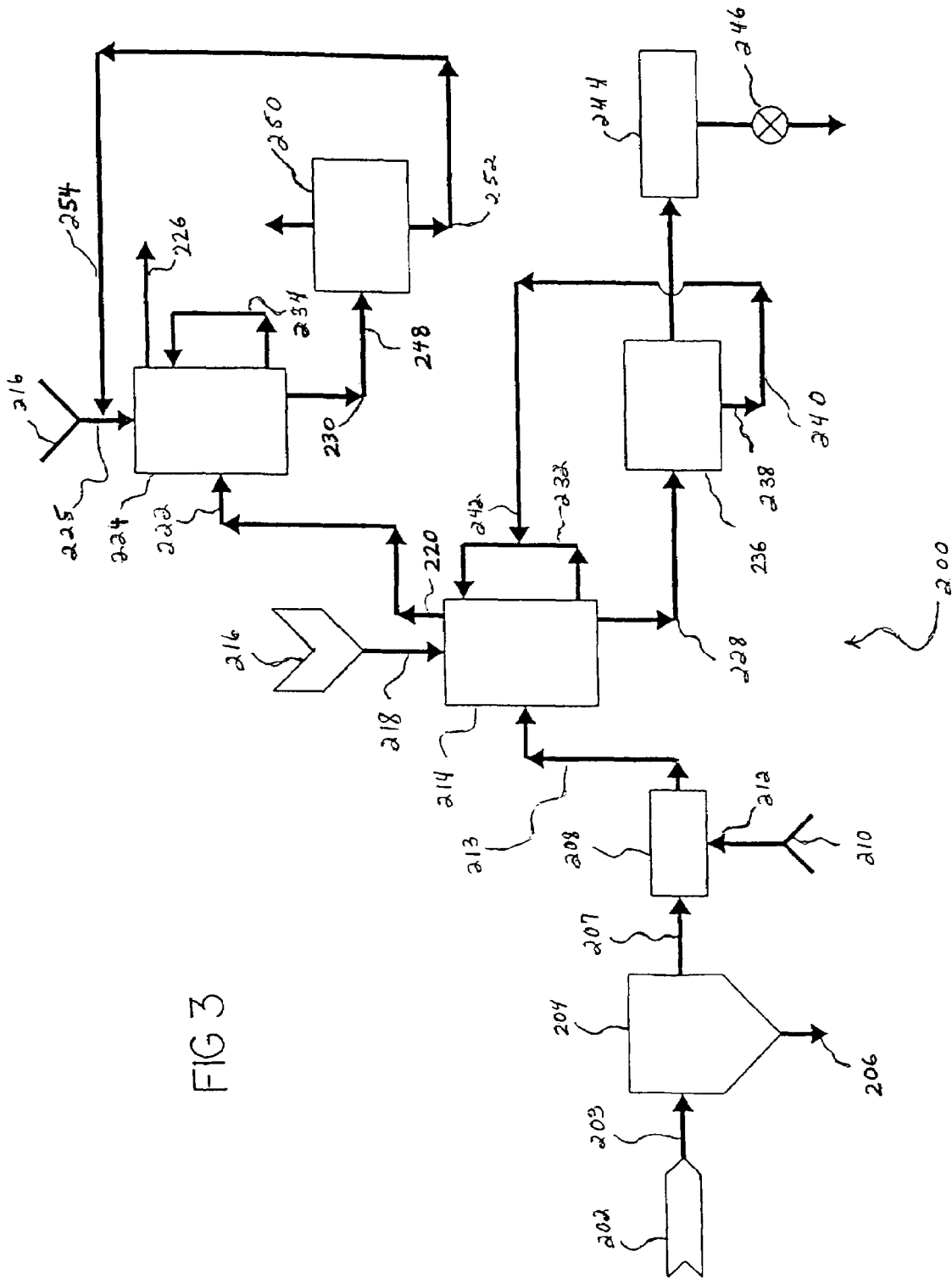
FIG. 3 is a schematic of a second alternate process flow diagram for an aqua ammonia process for the simultaneous removal of $SO_2$, $NO_x$, HCl, and HF from flue gas with subsequent removal of $CO_2$, and regeneration of ammonia from a solution or slurry of the $CO_2$ removal product, in accordance with features of the present invention.

Scrubbing of $SO_3$ and $NO_2$ With Regeneration of $NH_3$ and $CO_2$ from Ammonium Bicarbonate Solution As depicted in FIG. 3, the instant invention provides a process such that $SO_3$ and $NO_2$ are scrubbed with stoichiometric amounts of ammonia with subsequent separate scrubbing of $CO_2$ with ammonia. Regeneration of ammonia and carbon dioxide occurs through the heating of the ammonium bicarbonate solution or slurry.

The process, designated as numeral 200, provides multi-pollutant control of $SO_2$, $NO_x$, $CO_2$, and trace acids such as hydrochloric acid (HCl) and hydrofluoric acid (HF). The process comprises integrated reaction and sorption steps in which $SO_3$ and $NO_2$ are scrubbed stoichiometrically. $CO_2$ is not initially scrubbed and ammonia is recovered downstream by thermal decomposition of an ammonium bicarbonate solution or slurry in water. As before, ambient atmospheric pressures of about 14.7 pounds per square inch absolute (psia) are typically accommodated in this process.

A flue gas 202, acid anhydride gases, ingress 203 of the flue gas 202 to the PCD 204, particulate matter egress 206, ingress 207 of the flue gas to the oxidizer reactor 208, and ingress 212 of the oxidants 210 to the oxidizer reactor 208 are as aforementioned. As before, the flue gas 202 exits from the oxidizer 208, with $SO_3$ and $NO_2$ present, and subsequently has a point of ingress 213 into a first scrubber 214. Ammonium hydroxide 216 enters that same first scrubber 214 through a point of ingress 218. As before, the amount of ammonium hydroxide 216 is such that it allows for stoichiometric reaction of the two acid anhydrides. Any carbon dioxide present is not reacted or "scrubbed" due to the much greater acid strength of $SO_3$ and $NO_2$.

As before, carbon dioxide, nitrogen, oxygen, and water vapor exit via a point of egress 220 from the first scrubber 214, with entry through a subsequent point of ingress 222 to a second scrubber 224. Ammonium hydroxide 216 is introduced into the second scrubber 224 through a point of ingress 225. The contact of the carbon-dioxide containing gas with ammonium hydroxide 216 in the second scrubber 224 results in nitrogen, oxygen, and water vapor exiting the second scrubber 224 via a point of egress 226. As before, the products of the neutralization reactions (ammonium salts) exist initially as a first slurry 228 and a second solution or slurry 230 of crystalline salts in water. Any residual ammonium hydroxide 216 is recirculated back to the neutralization chambers for reuse via a first recirculation path 232 and a second recirculation path 234.

The first slurry 228 contains ammonium chloride, ammonium fluoride, ammonium nitrate, and ammonium sulfate, and a possible trace amount of ammonium bicarbonate. The second solution or slurry 230 contains only ammonium bicarbonate or ammonium carbonate. The first slurry 228 is dewatered via a means to effect filtration or centrifugation 236. Any supernatant 238, exits from the filter or centrifuge 236 via a point of egress 240, and is recycled for reuse through a point of ingress 242 back to the first scrubber 214.

The first salt batch 228 (ammonium chloride, ammonium fluoride, ammonium nitrate, and ammonium sulfate and a possible trace amount of ammonium bicarbonate) is subjected to a crystallizer (dryer) 244. After having been dried, the first salt batch (now a crystal or powder stream) leaves the system 200 through a point of egress 246 to be eventually used as fertilizer.

The second solution or slurry (ammonium bicarbonate) 230 enters, through a point of ingress 248, into a regenerator 250 wherein the solution or slurry is heated to decompose the ammonium bicarbonate to ammonium hydroxide and carbon dioxide. The regenerated ammonium hydroxide stream 252 is recycled for carbon dioxide absorption purposes, via a point of ingress 254 back into the second scrubber 224. As before, the product carbon dioxide from the thermal decomposition of ammonium bicarbonate can be sequestered.

Ammonia 252 and carbon dioxide are regenerated from the ammonium bicarbonate solution or slurry 230 by directly heating the slurry 230 in a heater/regenerator 250 up to a temperature of from about 60° C. to 80° C.

In all three processes described supra, the dewatered slurries of ammonium salts can be sold as fertilizer without the drying or crystallization steps disclosed therewith. Thus, those steps and that equipment can be bypassed or even omitted from the system if needed.

A myriad of oxidizing agents are utilized in the invented method, including various chemical and mechanical means. For example, suitable oxidizing agents include, but are not limited to, ozone ($O_3$), chlorine dioxide ($CO_2$), hydrogen peroxide ($H_2O_2$), and irradiation initiated techniques.

The following examples are for illustrative purposes only.

Absorption/Regeneration Examples

A simulated flue gas [15 mole (mol) % $CO_2$ and 85 mol % nitrogen, $N_2$] was utilized in this example. The reactor comprised a double-jacketed glass column packed with structured packing (BX Gauze, Koch Engineering Company, Wichita, Kans.) at 85° F. (29° C.). The flue gas flowed countercurrent to the ammonia solution.

Table 1 displays test results of $CO_2$ capture by ammonia solution in three different concentrations at 85° F. (29° C.). The packed bed was 21 inches (in) in height.

TABLE 1

| $CO_2$ ABSORPTION BY AMMONIA SOLUTION | | |
|---|---|---|
| $NH_3$ conc. wt. % | $NH_3/CO_2$ molar ratio | $CO_2$ % removal efficiency |
| 28.0 | 10.1 | 97 |
| 16.9 | 6.1 | 94 |
| 5.6 | 2.0 | 70 |

As expected, a higher ammonia concentration gives a greater carbon dioxide removal efficiency.

Another series of experiments of an aqua ammonia process for $CO_2$ capture were conducted, under conditions similar to those for the data in Table 1, to simulate a steady-state condition under semi-continuous recycle absorption and regeneration operation. Three different solution concentrations were used, 14%, 10.5%, and 7% ammonia by weight (wt.). The procedure involved using a continuous flow of simulated flue gas which contained 15% $CO_2$ and 85% nitrogen. After the aqua ammonia solution was saturated with flue gas using a bubbler, the absorbent solution was regenerated by heating to separate $CO_2$ from the $CO_2$-rich absorbent solution.

The first-time regenerated solution was then used to reabsorb $CO_2$. After the second $CO_2$-absorption, the aqua ammonia solution was once again regenerated by heating to release absorbed $CO_2$. The absorption/regeneration cycle was repeated for a third time. The $CO_2$ loading capacity of the original fresh aqua ammonia solution dropped after the first absorption/regeneration cycle. However, no detectable $CO_2$ loading capacity decrease of the solution was observed between the second and third absorption/regeneration cycles. This observation indicated that the simulated testing had reached a steady-state condition in the second and third absorption/regeneration cycles. Thus, an aqua ammonia solution can most likely be used for many absorption/regeneration cycles.

Table 2 displays steady-state loading capacities for the three aqua ammonia solutions used.

TABLE 2

STEADY-STATE LOADING CAPACITIES[a]

| Aqua Ammonia Concentration (wt. %) | Loading Capacity (g $CO_2$/g solution) |
|---|---|
| 14 | 0.068 |
| 10.5 | 0.053 |
| 7 | 0.04 |

[a]After the effect of the first absorption/regeneration cycle.

The loading capacities compare favorably to current MEA technology. The lowest aqua ammonia $CO_2$-loading capacity, at the ammonia concentration of 7 wt. %, is comparable to the $CO_2$-loading capacity of 20 wt. % MEA. This demonstrates that more $CO_2$ can be transferred by a lesser concentration of aqua ammonia solution (and thus a lesser mass of ammonia than of MEA) relative to the performance of aqueous solutions of MEA.

There are at least three reactions which can be responsible for the liberation of $CO_2$ during thermal regeneration. These reactions are given below in Equations 6 through 8.

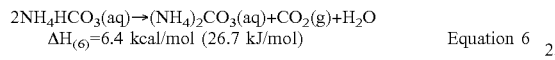

$2NH_4HCO_3(aq) \rightarrow (NH_4)_2CO_3(aq) + CO_2(g) + H_2O$
$\Delta H_{(6)} = 6.4$ kcal/mol (26.7 kJ/mol)  Equation 6

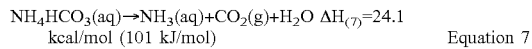

$NH_4HCO_3(aq) \rightarrow NH_3(aq) + CO_2(g) + H_2O$ $\Delta H_{(7)} = 24.1$ kcal/mol (101 kJ/mol)  Equation 7

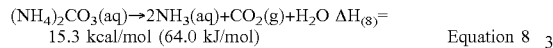

$(NH_4)_2CO_3(aq) \rightarrow 2NH_3(aq) + CO_2(g) + H_2O$ $\Delta H_{(8)} = 15.3$ kcal/mol (64.0 kJ/mol)  Equation 8

The heat of reaction for the MEA absorption process has been reported to be 20.0 kcal/mol (83.7 kJ/mol). In addition to the heat of reaction and sensible heat requirements, a major contributor to the energy requirements for a MEA process is the heat of vaporization to generate steam to carry the $CO_2$ overhead in a MEA regenerator. A reflux ratio of 2.0 moles of water (steam) to each mole of $CO_2$ is common. The energy required to regenerate this amount of steam is an additional 18.9 kcal/mol (79.1 kJ/mol) of $CO_2$. Since the regeneration of the aqua ammonia solutions is conducted without this steam energy requirement, an additional energy savings is realized as opposed to the requirements for a MEA-based process. Depending upon which reaction (Equations 6-8) the regeneration step of an absorption/regeneration cycle follows, a 50% to 65% improvement in thermal efficiency is realized by using the aqua ammonia process as opposed to a MEA-based process.

The invented process is relatively simple and quick, generates little or no waste products, thus providing a less costly process with little or no waste disposal problems, and provides useful products. Affordability of the process is offered by the simultaneous removal of all acid gases through a single aqua ammonia process.

In addition, the instant invention provides a singular method and device for the capture and separation of gases such as $CO_2$ and other environmental compounds from effluent gas streams via the use of aqua ammonia or aqueous ammonium hydroxide as a scrubber solution.

Further, the gaseous acid anhydrides can be oxidized before any additional treatment occurs. This feature provides a simpler process at considerable cost savings.

The solvent, aqua ammonia or ammonium hydroxide, can be regenerated and used for additional neutralization/regeneration cycles thus allowing for additional cost savings. Further, the solvent has a superior loading capacity for greenhouse gases such as carbon dioxide.

The absorption products can be used as fertilizer, or, in the instance of ammonium bicarbonate, thermally decomposed to regenerate the ammonia for subsequent reuse in the aqua ammonia scrubbing process, and to regenerate the carbon dioxide for use or storage. This further reduces the cost of the overall air pollution control process.

While the invention has been described with reference to details of the illustrated embodiment, these details are not intended to limit the scope of the invention as defined in the appended claims.

We claim:

1. A process for removing acid anhydrides precursors and other acid moieties from flue gases, the process comprising:
   a) cooling the flue gases containing $CO_2$, acid anhydride precursors and other acid moieties;
   b) removing particulate matter from the flue gases;
   c) oxidizing the acid anhydrides precursors to oxidized anhydrides, wherein the acid anhydrides precursors are selected from the group consisting of $SO_2$ and $NO_x$, and the acid moieties are selected from the group consisting of HCl, HF and hydrogen halides;
   d) simultaneously converting the oxidized anhydrides precursors and the other acid moieties to ammonia salts by reaction with ammonia-containing compounds;
   e) subsequently converting $CO_2$ to an ammonia salt by reaction with aqua ammonia; and
   f) collecting the ammonia salts from steps d) and e).

2. The process as recited in claim 1 wherein gaseous anhydrides are oxidized to higher gaseous acid anhydrides.

3. The process as recited in claim 1 wherein the ammonia-containing compounds are water-soluble compounds selected from the group consisting of aqueous ammonia, ammonium hydroxide, ammonium carbonate, ammonium carbamate, and combinations thereof.

4. The process as recited in claim 1 wherein the ammonia salt obtained in step e) is ammonium bicarbonate and said ammonium bicarbonate is decomposed to generate a gas mixture comprising $CO_2$ and $NH_3$ or $CO_2$ and $(NH_4)_2CO_3$.

5. The process as recited in claim 1 wherein the process is carried out at temperatures of from about 15° C. to 50° C.

6. The process as recited in claim 4 wherein the regeneration is carried out at a temperature from about 35° C. to 80° C.

7. The process as recited in claim 4 wherein ammonia and ammonia-containing compounds generated from the decomposition of ammonium bicarbonate are recycled for use in the conversion step.

8. The process as recited in claim 1 wherein the other acid moieties are hydrogen halides.

9. The process of claim 1 further comprising the step of decomposing the ammonia salt obtained in step e).

* * * * *